Nov. 22, 1949 V. P. MATHEWS 2,488,921
FLUID FILTER
Filed June 26, 1948
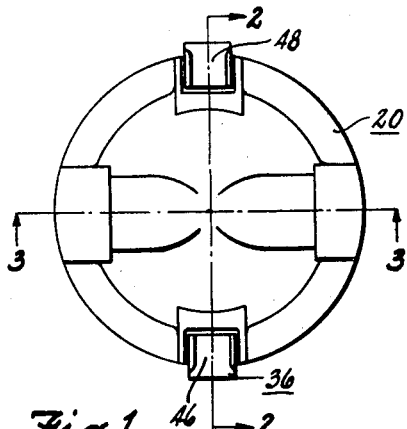
Fig. 1.
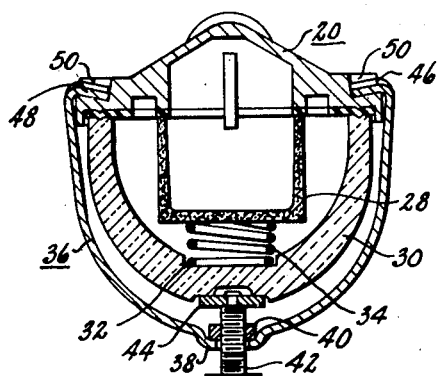
Fig. 2.
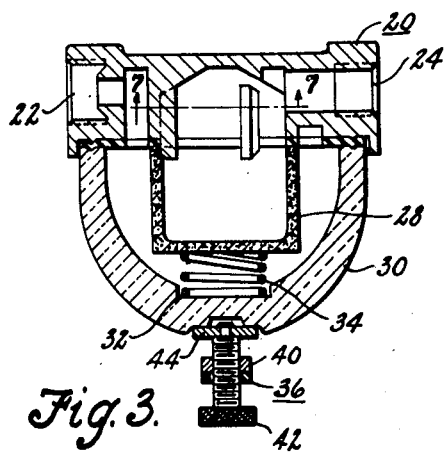
Fig. 3.
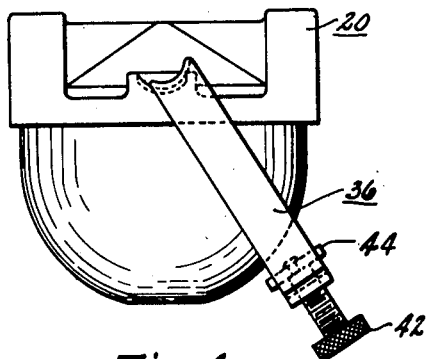
Fig. 4.
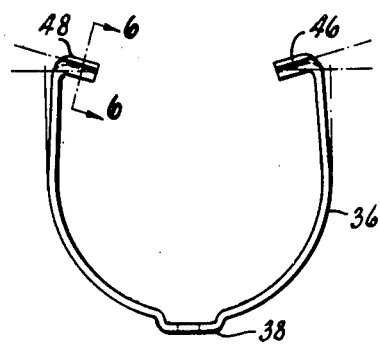
Fig. 5.
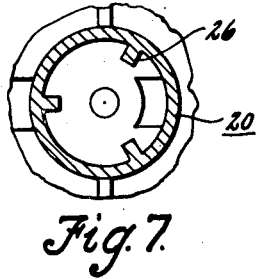
Fig. 6.
Fig. 7.
INVENTOR.
VERNER P. MATHEWS Patented Nov. 22, 1949

2,488,921

UNITED STATES PATENT OFFICE 2,488,921

FLUID FILTER

Verner P. Mathews, Dayton, Ohio, assignor to General Motors Corporation, Detroit, Mich., a corporation of Delaware Application June 26, 1948, Serial No. 35,483

2 Claims. (Cl. 210—165)

This invention relates to fluid filters and is particularly concerned with an attaching means for assembling the filter parts and holding them in position.

It is therefore an object of the invention to provide a gasoline filter construction wherein a revolvable bale is used which cooperates with the head of the filter for holding the bowl portion in fixed relation thereto. The bale is so constructed as to be easily rotatable around the head portion of the filter to permit removal or replacement of the bowl.

A still further object of the invention is to provide a bale made out of a single flat piece of spring steel or the like which includes two inturned ears at the ends thereof that have an arcuate bearing point thereon, these ears being adapted to cooperate with semi-circular depressions in the head of the filter element so that the bale is rotatable around the head while being held in position thereto by the spring tension of the bale.

In carrying out the above object, it is still a further object to form the curved surfaced ears on the bale at an angle less than 90° with respect to the adjacent portions of the bale, which angle improves the hold of the bale on the head whereby accidental displacement thereof is difficult.

Further objects and advantages of the present invention will be apparent from the following description, reference being had to the accompanying drawing, wherein preferred embodiments of the present invention are clearly shown.

In the drawing:

Fig. 1 is a top view of one type of a gasoline filter.

Fig. 2 is a view in section of said gasoline filter, taken on the line 2—2 of Fig. 1.

Fig. 3 is a section of the gasoline filter taken on the line 3—3 of Fig. 1.

Fig. 4 is a side view of the gasoline filter with the bale in displaced position whereby the bowl may be removed.

Fig. 5 is a view of the bale per se.

Fig. 6 is a view taken on the line 6—6 of Fig. 5, showing the curved contour of one of the ears of the bale.

Fig. 7 is a sectional view taken on the line 7—7 of Fig. 3, showing the centering lugs for the filter.

Filters for use in automotive engines or any engine using fluid fuel are well known in the art. These filters generally include a head portion having an inlet and an outlet which may be placed in the fuel line of the engine. Between the inlet and outlet suitable filter means are disposed to remove particles of the extraneous material which may be in the fuel. Around this filter and in fluid tight relation to the head, a bowl is generally provided which for visual reasons is made of some transparent material such as glass or plastic. In order to hold the bowl in fluid tight relation to the head, a bale wire is often utilized which fits in depressions in the head and which includes a screw at the central portion thereof that is adapted to be tightened against the bowl to hold the same in position. In the past, these bales have been made of wire which necessitates an expensive construction at the central portion thereof in order to accommodate the screw. Similarly, the wire is not of sufficient strength when the screw is tightened excessively. Similarly, when the screw is loosened, the wire falls off, and in many cases, the bowl drops out and is broken. On reassembly of the device, which is generally in a rather inaccessible position, it is quite difficult to get all the parts held in position simultaneously in order to permit tightening of the screw. In order to eliminate these difficulties, bales from flat stock have been made which are pivotally and hingedly connected to the head portion of the filter. In this manner, the bale may be swung around its pivots and being hingedly mounted thereto, remains in position so that the bowl may be easily removed. While this construction is satisfactory in some instances, it is expensive and when a die-cast head is used, the hinge points which comprise studs pressed into the head do not have sufficient strength in many instances to withstand the stress caused by the tightening of the screw, thereby pulling the studs out of the die-casting and completely ruining the entire filter.

In order to eliminate past difficulties and to provide an improved structure, I have designed a bale which cooperates with the head portion and bowl of the filter assembly and which remains in fixed relation with respect to the head during removal of the bowl without requiring hinges or the like. This bale construction also is cheap to manufacture since there is sufficient stock in the bale to provide threads for the screw if desired. Similarly, when used in connection with the die-cast head, it is impossible to destroy the die-casting or in any way injure the same by excessive tightening of the screw.

Referring specifically to the drawings, a die-cast head 20 is shown in Fig. 1 which includes an inlet 22 and an outlet 24 suitably threaded for compression fittings or flange tubing connections. The head 20 preferably includes three equally spaced, centrally located lugs 26 extending downwardly past the lower surface of the head to act as a centering means for a porous metal filter element 28. The element 28 is preferably made from molded sintered non-compacted metal powder and in the preferred embodiment is an alloy of copper and tin or copper and nickel, although the particular metals used are no limitation here. Patents which disclose the manufacture of sintered porous non-compacted metal powder objects are: Davis, 2,157,596; Keohring, 2,198,702; and Olt, 2,273,589. A glass or plastic bowl 30 is provided which fits against the head on an annular seat and may include a gasket therebetween. The bowl 30 includes a circular depression 32 at the base thereof to act as a seat for a spring 34 that holds the filter 28 in position when the bowl is clamped to the head 20.

In order to effect this clamping, a bale 36 is provided which is made from a single piece of flat spring stock. The bottom or central portion 38 thereof, as shown in Fig. 5, is depressed so that a nut 40 fits in the depression and is prevented from turning relative to the bale. A knurled screw 42 passes through the bale and the nut and preferably includes a turnable washer 44 attached to the end thereof to give a large bearing surface against the bowl 30. The upper ends of the bale are turned inwardly to form ears 46 and 48. These ears are contoured as shown in Fig. 6 to provide a rounded surface. The ears fit into a pair of depressions or seats 50 also having a rounded contour in the head 20. It will be noted that the specific angle of the ears relative to the main portion of the bale is less than 90° and preferable about 80°. This angle is very important and the angle of the seats 50 is the same or slightly less. Thus when the bale ears 46 and 48 are nested in the seats 50 and the screw 42 is tightened against the bowl 30, the ears are pulled down into snug relation to the seats and provide a spring hold against the bowl.

When it is desired to remove the bowl 30 from the structure, the screw 42 is loosened and the bale is rotated in the seats 50, as shown in Fig. 4, a sufficient distance to permit removal of the bowl. The bale however remains in association with the head due to the angulation of the side portions thereof as noted in Fig. 5 where the side portions are about 5° off the vertical. Thus the bale tightly grips the head and is rotatable thereabout without displacement so that the bowl 30 can be removed and replaced with great ease.

It should be understood that the angle of the ears and the angle of the side portions of the bale are both important factors to the success of this invention. Both of these angles attribute utility to the construction for without this angulation, the bale will fall out of place when the screw 42 is loosened, whereas with the angulation, the bale stays rotatable associated to the head.

It will further be noted that the construction is simple and inexpensive since the bale can be made from a single piece of flat spring stock, such as steel, Phosphor bronze or any other suitable metallic material. It may be easily formed in a punch press to a slight angularity at the sides and at the ears and during the formation thereof, the rounded surface may be provided simultaneously. In place of a nut 40, it is apparent that the bale itself can be threaded as desired, although the construction shown is less expensive.

It is understood that the bale is formed from spring stock which is heat treated after formation.

While the embodiments of the present invention as herein disclosed, constitute preferred forms, it is to be understood that other forms might be adopted.

What is claimed is as follows:

1. A fuel filter comprising in combination, a head portion including an inlet and an outlet, a filter element disposed between said inlet and outlet, a bowl for covering said filter and adapted to be held in fluid tight relation to said head, a bale consisting of a single piece of flat spring stock and adapted to encircle said bowl, said bale including inwardly turned ear portions at the ends thereof having rounded surfaces thereon, said rounded ear surfaces being inclined downwardly from the horizontal, said ear surfaces being adapted to fit within and bear on rounded open seats formed directly in the upper surface of the head portion, the sides of said bale being angled inwardly away from the vertical a sufficient distance so that the measurement between the free ends of the bale ears is less than the measurement between the said seats so that when the bale is in position within the seats, it is under gripping tension, said bale including a screw at the central bottom portion thereof for engaging the bowl and holding the same in fixed relation to the head, said bale being rotatable about said seats when the screw is loosened to permit removal or replacement of the bowl.

2. A fuel filter comprising in combination, a head portion including an inlet and an outlet, a porous metal filter element disposed between said inlet and outlet, said porous metal portion being formed from sintered non-compacted metal powder, a transparent bowl for covering said filter and adapted to be held in fluid tight relation to said head, a bale consisting of a substantially U-shaped flat piece of spring metallic stock of continuous extent adapted to encircle said bowl and including inwardly turned ear portions at the two upper extremities thereof having rounded bearing surfaces thereon and being inclined downwardly from the horizontal, said ear portions being adapted to fit within rounded open seats formed directly in the upper surface of the head portion, the sides of said U-shaped bale being angled inwardly so that the distance between said sides at the open end of the bale is slightly less than the distance between said sides at the closed end of the bale, said distance between the open ends of the bale being less than the measurement between said seats in the head portion so that when the bale is in position within the seats that it is under gripping tension, and a screw disposed at the central portion of the bale for engaging the bowl and holding the same in fixed relation to said head, said bale being rotatable about said seats and head when the screw is loosened to permit removal or replacement of the bowl.

VERNER P. MATHEWS.

REFERENCES CITED

The following references are of record in the file of this patent:

UNITED STATES PATENTS

| Number | Name | Date |
|---|---|---|
| 1,682,867 | Thomas | Sept. 4, 1928 |
| 2,369,902 | Krueger | Feb. 20, 1945 |

FOREIGN PATENTS

| Number | Country | Date |
|---|---|---|
| 223,381 | Great Britain | 1924 |
| 351,705 | Great Britain | 1931 |